(12) United States Patent
McVickar et al.

(10) Patent No.: US 8,744,948 B1
(45) Date of Patent: Jun. 3, 2014

(54) MOBILE DATA IMPORT FOR A FINANCIAL RETURN

(75) Inventors: Richard E. McVickar, San Diego, CA (US); Takashi Kuwahara, San Diego, CA (US); Azhar M. Zuberi, San Diego, CA (US); Christopher Morgan Dye, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 77 days.

(21) Appl. No.: 13/348,529

(22) Filed: Jan. 11, 2012

(51) Int. Cl.
 *G06Q 40/00* (2012.01)
 *G06F 17/22* (2006.01)
 *G07F 19/00* (2006.01)

(52) U.S. Cl.
 USPC .............................. 705/36 T; 705/31; 705/35

(58) Field of Classification Search
 USPC ............................................ 705/31, 35, 36 T
 See application file for complete search history.

(56) References Cited

U.S. PATENT DOCUMENTS

| | | | |
|---|---|---|---|
| 7,860,763 B1 * | 12/2010 | Quinn et al. ................... | 705/31 |
| 2002/0111888 A1 * | 8/2002 | Stanley et al. ................. | 705/31 |
| 2005/0125342 A1 * | 6/2005 | Schiff ............................ | 705/39 |
| 2009/0037461 A1 * | 2/2009 | Rukonic et al. ............ | 707/103 R |
| 2011/0022312 A1 * | 1/2011 | McDonough et al. ........ | 701/209 |
| 2011/0238474 A1 * | 9/2011 | Carr et al. ................... | 705/14.23 |
| 2011/0270763 A1 * | 11/2011 | Graham et al. ................ | 705/71 |
| 2012/0149309 A1 * | 6/2012 | Hubner et al. .............. | 455/67.11 |
| 2012/0173397 A1 * | 7/2012 | Elwell et al. .................... | 705/35 |

\* cited by examiner

*Primary Examiner* — Thomas M Hammond, III
*Assistant Examiner* — John Scarito
(74) *Attorney, Agent, or Firm* — Osha Liang LLP

(57) ABSTRACT

A method for obtaining financial data for use in a financial return of a tax paying entity, including: obtaining credentials of the tax paying entity; determining, by a computer processor, that the financial data is available for download from a data provider; sending a first text message to a mobile device of the tax paying entity indicating that the financial data is available for download; receiving, from the mobile device, a second text message requesting to import the financial data into the financial return; sending, to the data provider, a request to download the financial data, where the request includes the credentials; downloading, after sending the request, the financial data into a data repository; and sending, after downloading the financial data, the financial data to a tax preparation application, where the financial data is imported by the tax preparation application into the financial return.

26 Claims, 7 Drawing Sheets

US 8,744,948 B1

MOBILE DATA IMPORT FOR A FINANCIAL RETURN

BACKGROUND

For consumers and businesses alike, tax preparation and compliance can be time consuming and difficult. Tax paying entities are required to aggregate large and sometimes disparate sets of financial data and to perform numerous error-prone calculations. Periodic preparation of financial returns, manual data entry, and record keeping also require significant resources and are prone to significant risk.

Tax preparation and financial management software can help to mitigate some, but not all, of this risk. Tax preparation software, for example, automatically performs many of the complex financial calculations required to complete a tax form. Additionally, financial software can electronically file some documents with the appropriate government agency and save electronic copies of the documents in a database on a user's personal computer.

Modern computing devices have become an indispensible tool of the average consumer. Many consumers now use a personal computing device, such as a laptop, to perform a variety of financial management tasks online. More recently, mobile devices have become an extremely disruptive force in the realm of finance. Mobile devices such as smartphones and tablet computers provide location-based services and real-time connectivity. Thus, a user may check the value of a financial portfolio, purchase a sale item on a favorite website, or search for a nearby merchant location without being tethered to a WIFI connection or a particular location.

SUMMARY

In general, in one aspect, the invention relates to a method for obtaining financial data for use in a financial return of a tax paying entity. The method includes: obtaining credentials of the tax paying entity; determining, by a computer processor, that the financial data is available for download from a data provider; sending, by the computer processor, a first text message to a mobile device of the tax paying entity indicating that the financial data is available for download; receiving, from the mobile device, a second text message requesting to import the financial data into the financial return; sending, to the data provider, a request to download the financial data, wherein the request includes the credentials; downloading, after sending the request, the financial data into a data repository; and sending, after downloading the financial data, the financial data to a tax preparation application, wherein the financial data is imported by the tax preparation application into the financial return.

In general, in one aspect, the invention relates to a system for obtaining financial data for use in a financial return of a tax paying entity. The system includes a processor, a data repository configured to store the financial data, and a data import engine executing on the processor and configured to: obtain credentials of the tax paying entity; determine that the financial data is available for download from a data provider; send a first text message to a mobile device of the tax paying entity indicating that the financial data is available for download; receive, from the mobile device, a second text message requesting to import the financial data into the financial return; send, to the data provider, a request to download the financial data, wherein the request includes the credentials; download, after sending the request, the financial data into the data repository; and send, after downloading the financial data, the financial data to a tax preparation application, wherein the financial data is imported by the tax preparation application into the financial return.

In general, in one aspect, the invention relates to a non-transitory computer-readable storage medium storing instructions for obtaining financial data for use in a financial return of a tax paying entity. The instructions include functionality to: obtain credentials of the tax paying entity; determine that the financial data is available for download from a data provider; send a first text message to a mobile device of the tax paying entity indicating that the financial data is available for download; receive, from the mobile device, a second text message requesting to import the financial data into the financial return; send, to the data provider, a request to download the financial data, wherein the request includes the credentials; download, after sending the request, the financial data into a data repository; and send, after downloading the financial data, the financial data to a tax preparation application, wherein the financial data is imported by the tax preparation application into the financial return.

Other aspects of the invention will be apparent from the following description and the appended claims.

DETAILED DESCRIPTION

Figure 1A:
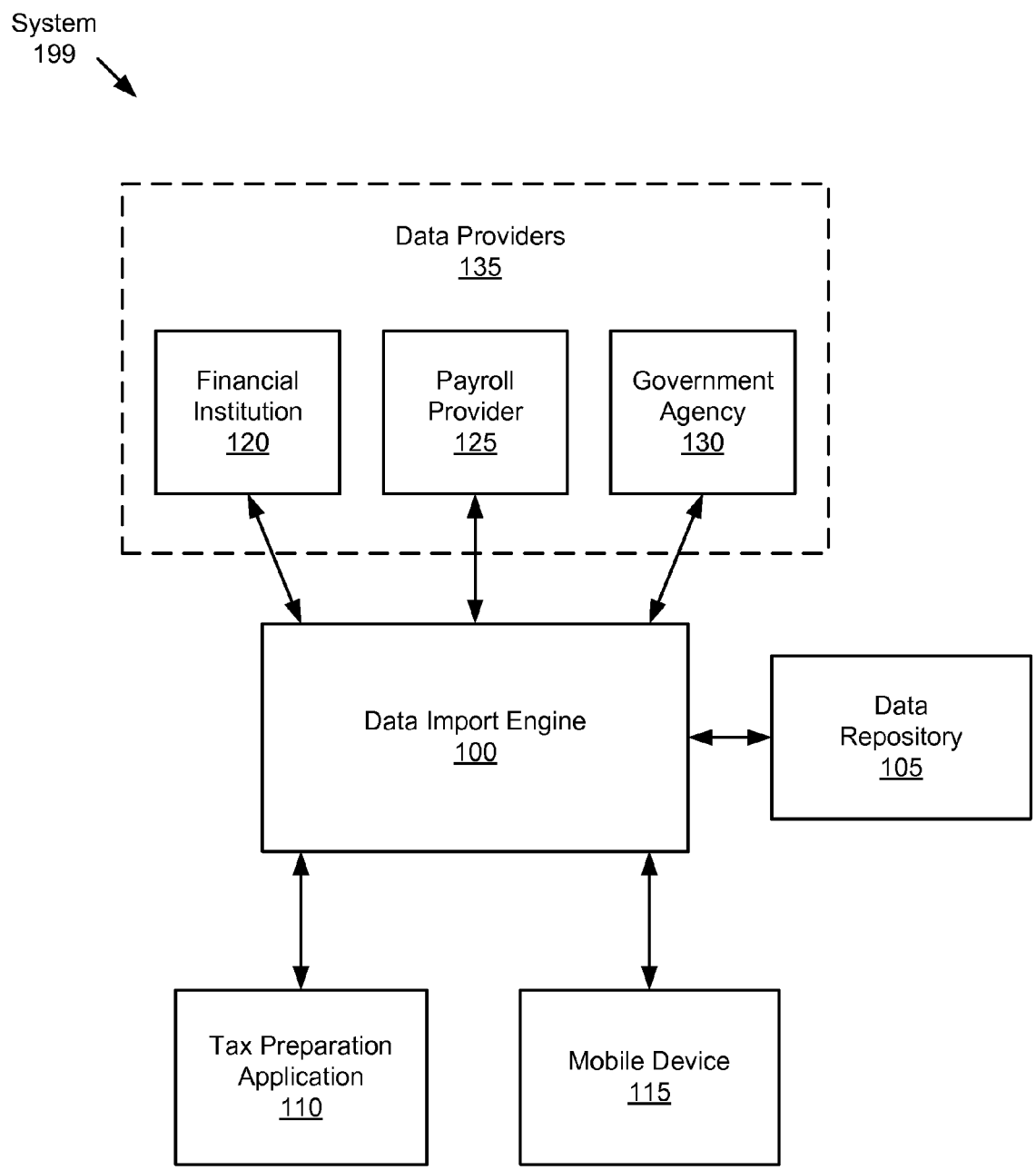
FIG. 1A shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for obtaining financial data for use in a financial return of a tax paying entity. In general, embodiments of the invention determine that the financial data is available for download from a data provider. A notification, such as a text message, may then be sent to a mobile device notifying the tax paying entity that the financial data is available. The financial data may be downloaded from the data provider and used to prepare the financial return.

FIG. 1A shows a system (199) in accordance with one embodiment of the invention. As shown in FIG. 1A, the system has multiple components including a data import engine (100), a data repository (105), a tax preparation application (110), a mobile device (115), and one or more data providers (135) (e.g., financial institution (120), payroll provider (125), and government agency (130)). The components of the system may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the data import engine (100) is a software application or a set of software applications executing on one or more hardware processors. The software application may be a web application in a server of a data center and/or a cloud computing application in a network distributed system. Alternatively, the data import engine (100) may be a software application residing in a standalone computing device (e.g., a desktop computer, etc.). In one or more embodiments of the invention, the data import engine (100) is integrated within or operatively connected to the tax preparation application (110), a financial management application (FMA), or other type of application.

In one or more embodiments of the invention, the data import engine (100) includes functionality to receive a request to download financial data of a tax paying entity from a data provider (135). Financial data may include, but is not limited to, investment data, income data, wage income data, interest income data, tax form data (e.g., internal revenue service (IRS) 1098, 1099, W-2 data), expense data, charitable contribution data, healthcare payment information, sales tax payments, property tax data, vehicle registration, rebate qualification, divorce records, previous tax filings, and/or any other financial data which may be utilized in the filing of a financial return. The request may be received from the tax preparation application (110), a third party software application, or from another person or entity. The request may be received prior to the filing of a financial return, and may be received prior to the end of a tax period for which the financial return is filed. Thus, for example, a corporation may submit requests for financial data for the 2012 tax year from three different data providers. The first request is received in the 2011 tax year and the subsequent two requests are received before the end of the 2012 tax year and prior to initiating a financial return for the 2012 tax year. Thus, a request to receive financial data from a data provider (135) may be received at any time prior to, during, and/or after filing of the financial return, in accordance with various embodiments of the invention.

In one or more embodiments of the invention, the tax paying entity is a person or entity (e.g., corporation, business, partnership, non-profit organization, etc.) who files a financial return with an agency (e.g., a government agency). The tax paying entity may be required to pay taxes or may receive a refund of an overpayment of taxes in reply to filing the financial return.

In one or more embodiments of the invention, a data provider (135) is any entity capable of providing financial data used in the preparation of a financial return of the tax paying entity. Examples of a data provider may include, but are not limited to, a financial institution (120), a payroll provider (125), a government agency (130), a healthcare provider, a vendor or service provider of the tax paying entity, and/or a non-profit organization. In one example, a lender holding a mortgage note on a property of an individual tax payer generates a form detailing an amount of mortgage interest paid during a specified tax year. In this example, the form is required by the individual tax payer to complete a personal income tax return. In another example, a payroll provider of a small business generates a report containing relevant payroll tax withholdings data for the small business. In this example, the payroll tax withholdings data is required to complete a federal income tax return for the small business. In yet another example, a local county tax assessor's office records all sales and property tax records for properties owned by a taxpayer. The taxpayer requires the data contained in the sales and property tax records in order to correctly calculate income, depreciation, and deductions on a personal income tax return.

In one or more embodiments of the invention, the data import engine (100) includes a user interface (not shown) configured to obtain input from one or more users. A user may be the tax paying entity or a representative of the tax paying entity. The user may be redirected from the tax preparation application (110) to the user interface and/or may access the user interface directly using a web browser. The user interface may be configured to update a profile of the tax paying entity, to enter contact or personal information (e.g., a mobile phone number, etc), to request data from one or more data providers, and/or to modify one or more download preferences (e.g., timing, selection of data providers, etc).

In one or more embodiments of the invention, the data import engine (100) includes functionality to obtain one or more credentials of the tax paying entity. The data import engine (100) may obtain the credentials directly from the tax paying entity by a user interface. The user interface may be integrated within or communicatively coupled to the tax preparation application or an associated application or may be displayed directly by the data import engine (100) via a web browser. In one or more embodiments of the invention, the data import engine (100) is configured to receive user credentials of the tax paying entity for a financial management application (FMA). The data import engine (100) may access the FMA and may obtain one or more credentials for one or more data providers (135) from the FMA. In this way, the user is not required to provide credentials to individual data providers if they are already stored in the FMA.

In one or more embodiments of the invention, the data import engine (100) includes functionality to determine that the financial data is available for download from one or more data providers. In one or more embodiments of the invention, the data import engine (100) polls one or more applications of identified data providers on a periodic or ad hoc basis. By polling the applications, the data import engine (100) may be able to determine if financial data is available and may then submit a request to download available data from the appropriate data providers. In one or more embodiments of the invention, the data import engine (100) initially requests data from one or more data providers (135). If the data is not yet available, the data import engine (100) may be configured to receive notifications from the data provider(s) (135) indicating that the data is available for download at a future time. In this way, the data import engine (100) may be configured to identify available data over any length of time prior to, during, and/or after filing of a financial return.

In one or more embodiments of the invention, the data import engine (100) includes functionality to send a text message to the mobile device (115) indicating that the financial data is available for download. The text message may include one or more selectable or described options. For example, the text message may request that the user reply to the message with another text message indicating a choice of 'Y' to proceed with importing financial data or a choice of 'N' to decline the request to import financial data. In another example, the user of the mobile device (115) may respond with one or more alphanumeric characters to select specific data providers to download from. In one or more embodiments of the invention, the data import engine (100) automatically downloads all available data from the data provider. In this case, the text message may simply inform the tax paying entity that the data has been downloaded from the data provider and/or is available for import into the tax preparation application (110). The mobile device (115) may be any mobile computing device used by the tax paying entity, a representative of the tax paying entity, or a third party conveying information to the tax paying entity.

In one or more embodiments of the invention, the data import engine (100) includes one or more dedicated text messaging addresses and/or phone numbers. Thus, the data import engine (100) may send text messages from the address(es) or phone number(s) and may receive reply text messages addressed to the address(es) or phone number(s). The data import engine (100) may be configured to interface with one or more mobile or cellular service providers in order to send/receive text messages.

In one or more embodiments of the invention, the data import engine (100) includes functionality to call the mobile device (115) using an interactive voice response (IVR) system. The data import engine (100) may then play a recording of the text message to the tax paying entity (or representative thereof) using the mobile device (115). In one or more embodiments of the invention, the data import engine (100) is configured to receive one or more touch tone selections using the IVR system. Thus, the data import engine (100) may audibly recite a series of menu options to the user (e.g., to download financial data from one or more data providers) and may receive a corresponding selection from the user (e.g., requesting to download all available data, requesting to download data from specific data provider(s)).

A text message is any format or type of message capable of being received by a mobile device. Examples of a text message may include, but are not limited to, an electronic mail message, a short message service (SMS) message, a push notification sent to a mobile device, a Hypertext Transfer Protocol (HTTP) message, a Multimedia Messaging Service (MMS) message, and an application specific message. Any message passing protocol may be used, in accordance with various embodiments of the invention.

Figure 1B:
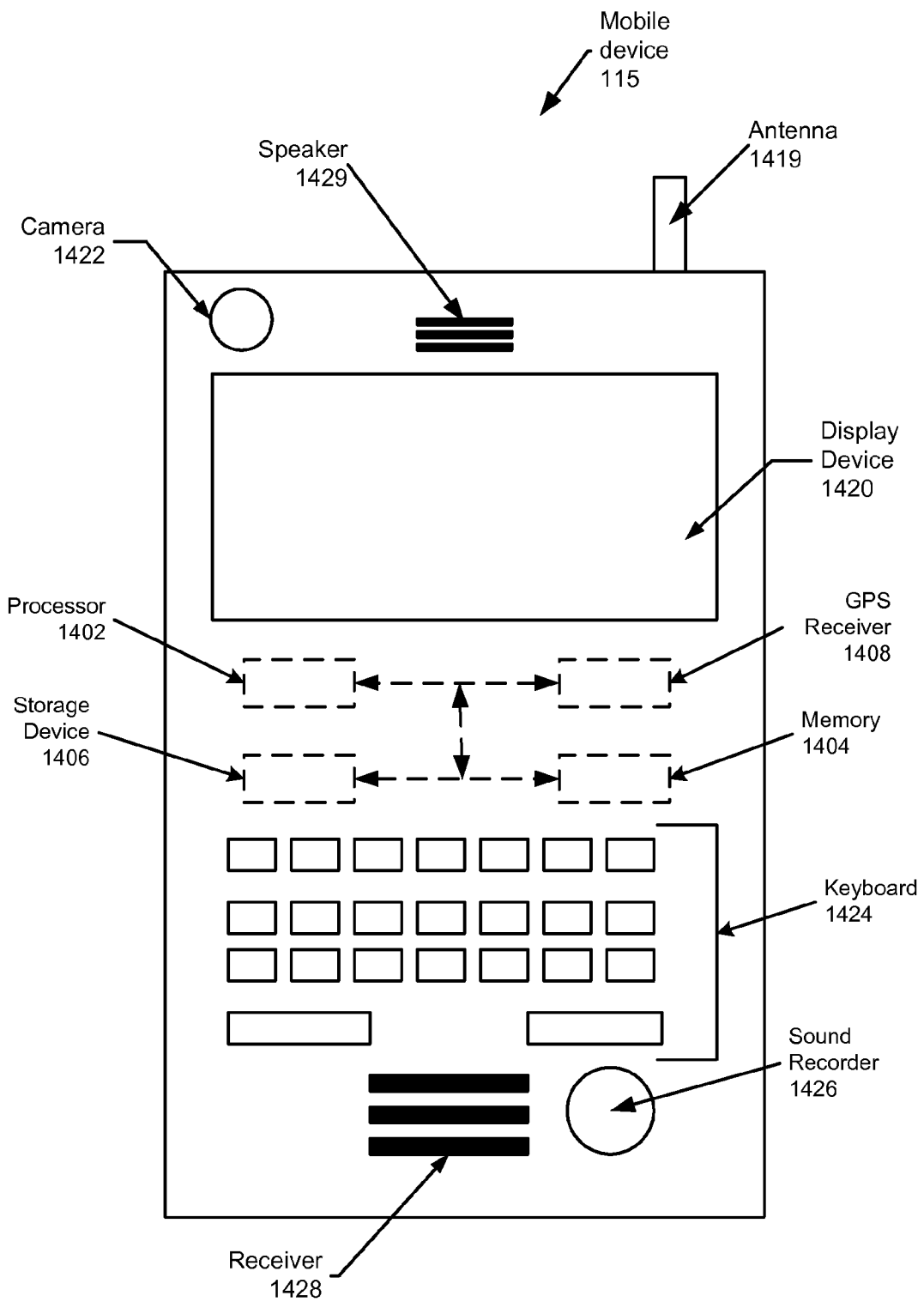
FIG. 1B shows a mobile device in accordance with one or more embodiments of the invention.

FIG. 1B shows a mobile device (115) in accordance with one embodiment of the invention. In one or more embodiments of the invention, the mobile device (115) is a portable device that provides a user interface. Examples of mobile devices may include, but are not limited to, cellular phones, personal digital assistants, personal communicators, pagers, smart phones, or any other computing device. In one or more embodiments of the invention, as shown in FIG. 1B, the mobile device (115) may include a processor (1402), memory (1404) (e.g., RAM, cache memory, flash memory, etc.), a storage device (1406) (e.g., a hard disk, an optical drive such as a compact disk drive or digital video disk (DVD) drive, a flash memory stick, etc.), a global positioning system (GPS) receiver (1408), a speaker (1429), a receiver (1428), a keyboard (1424), a sound recorder (1426), a display device (1420), a camera (1422), and an antenna (1419), and numerous other elements and functionalities typical of today's mobile devices (not shown).

The mobile device (115) may include input means and output means, such as the keyboard (1424), the receiver (1428), and/or the display device (e.g., a liquid crystal display screen) (1420), which permits a user to enter and/or display keystrokes including numeric, alphabetic, and other characters, images, or other media types. Other input devices may include a camera (1422), a sound recorder (1426), and/or other data recording mechanism. Those skilled in the art will appreciate that these input and output means may take other forms now known or later developed.

The mobile device (115) may be connected to a network (e.g., a local area network (LAN), a wide area network (WAN) such as the Internet, or any other similar type of network) via the antenna (1419) or other network interface connection(s) (not shown). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (115) with a mobile device identifier of the mobile device (115).

In one or more embodiments of the invention, the network connection may be facilitated by a hardwired or other similar connection. For example, the network connection may involve a hardwire connection or short-range wireless connectivity technology with a second mobile device, a printing mechanism, a scanner, or a recording system.

In one or more embodiments of the invention, the GPS receiver (1408) includes functionality to obtain a location coordinate of the mobile device (115). In one or more embodiments of the invention, the mobile device (115) includes functionality to send, using the GPS receiver (1408), location coordinates to the data import engine (100 in FIG. 1A). The location coordinates may be sent over a predefined period of time and may be sent at predefined intervals (e.g., by a mobile application (not shown)). Alternatively, the mobile application may be configured to communicate the location coordinate(s) to the data import engine (100 in FIG. 1A) in response to a request.

In one or more embodiments of the invention, the mobile device (115) includes functionality to receive input from the tax paying entity or a representative of the tax paying entity. The mobile device (115) may display the text message to a user (e.g., the tax paying entity) and may receive selection of a hyperlink or other option to respond to a first text message received from the data import engine (100 in FIG. 1A). In response to selection of the hyperlink, the mobile device (115) may send a notification to download financial data from a data provider to the data import engine (100 in FIG. 1A). In one or more embodiments of the invention, the mobile device (115) is configured to send a reply text message in response to the first text message. The reply text message may include a selection of one or more data providers (135 in FIG. 1A) from which to download financial data.

In one or more embodiments of the invention, the mobile device (115) includes functionality to execute a mobile application (not shown). The mobile application may be configured to receive one or more push notifications from the data import engine (100 in FIG. 1A). A push notification may be used to notify the user of the mobile device (115) (e.g., the tax paying entity) that data is available for download from one or more data providers.

Returning to FIG. 1A, in one or more embodiments of the invention, the data import engine (100) includes functionality to receive a text message from the mobile device (115). The text message may be in reply to an original text message sent by the data import engine (100) and may include a selection by the user to download financial data from one or more data providers (135). Thus, the user may respond with an approval or denial of the request to download data and/or may include one or more options specifying specific data providers or data to include/exclude from the download. Any type of messaging protocol may be used, in accordance with various embodiments of the invention.

In one or more embodiments of the invention, the data import engine (100) includes functionality to send a request to one or more data providers (135) to download financial data. The data import engine (100) may be configured to send the request to a server application of the data provider and may include one or more predefined credentials authenticating the data import engine (100) and/or the tax paying entity. The data import engine (100) may also encrypt the request and/or send the request over a secure channel. The request may include data identifying the tax paying entity (e.g., name, social security number, tax ID number, address, etc.), a digital signature (or similar form of authentication), a date range or filing period for which is data is requested, and/or a selection of one or more types of data. The request may be sent to an application programming interface (API) of the server application and may utilize any number of predefined commands to specify the data being requested. In one or more embodiments of the invention, the data import engine (100) does not send a request for the data and, instead, the data is either pushed by the data provider or identified by the data import engine (100) using polling or some other method.

In one or more embodiments of the invention, the data import engine (100) includes functionality to download financial data from one or more data providers (135). After authenticating the request, the data import engine (100) may receive the financial data in any number of file formats. For example, the data may be downloaded from a file transfer protocol (FTP) server using credentials provided by the data provider. In another example, the data is downloaded using hypertext transfer protocol (HTTP) messages sent to a web server.

In one or more embodiments of the invention, the data import engine (100) includes functionality to send financial data downloaded from one or more data providers (135) to the tax preparation application (110). The data import engine (100) may send a notification that the data is ready to the tax preparation application (110). Upon receiving the notification and/or upon approval of the tax paying entity, the tax preparation application (110) may proceed to download the financial data from the data repository (105). Alternatively, the financial data may be stored in a common location (e.g., data repository (105)) used by both the tax preparation application (110) and the data import engine (100) such that no download is necessary. In one or more embodiments of the invention, the financial data is imported into the tax preparation application (110) to be used in one or more financial returns of one or more tax paying entities.

In one or more embodiments of the invention, the data import engine (100) includes functionality to receive one or more location coordinates from the mobile device (115). The data import engine (100) may be configured to request the location coordinates and/or to periodically receive them from a mobile application of the mobile device (115). In one or more embodiments of the invention, the location coordinates correspond to a periodic action or movement of the tax paying entity and are within a predefined distance of an address of one or more data providers (135).

In one or more embodiments of the invention, the data import engine (100) includes functionality to determine that an address of a data provider is within a predefined distance of the one or more location coordinates. The data import engine (100) may be configured to receive the predefined distance from a user or administrator. After obtaining the location coordinate(s) from the mobile device (115), the data import engine (100) may calculate a distance between the address of the data provider and the location depicted by the coordinate (s). Based on the calculation, the data import engine (100) may determine whether or not the address lies within the predefined distance of the location coordinate(s). In one or more embodiments of the invention, after determining that the address is within the predefined distance, the data import engine (100) sends a message to the tax paying entity. The message may ask the tax paying entity (or a representative) whether or not financial data should be requested from the data provider by the data import engine (100).

In one or more embodiments of the invention, the data import engine (100) includes functionality to identify a data provider on a social networking website (not shown). The data import engine (100) may access a profile of the tax paying entity on the social networking website and may search the profile for a reference to one or more data providers (135). For example, the tax paying entity may identify a business relationship with the data provider on the profile. In another example, the tax paying entity may subscribe or recommend the data provider or one or more products or services of the data provider. In yet another example, the tax paying entity may "like" or otherwise express a positive sentiment towards the data provider on the social networking website.

In one or more embodiments of the invention, the data import engine (100) includes functionality to periodically download financial data from one or more data providers (135). The financial data may be a bulk download of all financial data for all tax paying entities involved with the data provider or may include only data relevant to tax paying entities whose authorization is received by the data import engine (100) and provided to the data provider. In one or more embodiments of the invention, the data import engine (100) downloads and aggregates this financial data in the data repository (105) prior to or after receiving any requests from the tax paying entity. Thus, the download may occur in accordance with a pre-existing agreement to share data between the data provider and an entity hosting the data import engine (100). After downloading the financial data, the data import engine (100) may identify and retrieve financial data of a single tax paying entity from the data repository (105).

In one or more embodiments of the invention, the data import engine (100) includes functionality to receive a request (e.g., a text message) from the tax paying entity for an estimated tax withholding amount. In response to the request, the data import engine (100) may calculate a projected tax liability of the tax paying entity. Based on the projected tax liability, the data import engine (100) may then calculate the estimated tax withholding amount and may send the estimated tax withholding amount to the tax paying entity (e.g., by sending a text message to the mobile device (115).

In one or more embodiments of the invention, the data import engine (100) includes an application programming interface (API). The API may provide functionality to one or more authorized data providers (135) (i.e., software applications used by the data providers) to push financial data to the data import engine (100) as it becomes available. Thus, the data import engine (100) may send requests for financial data to one or more data providers (135) and may subsequently receive data periodically via the API as it becomes available (i.e., when the data is pushed by the data provider(s)). Thus, in one or more embodiments of the invention, partial data is submitted from a single provider as it becomes available.

In one or more embodiments of the invention, the data import engine (100) includes functionality to access a web application (not shown) of a data provider using credentials of the tax paying entity. The data import engine (100) may download financial data from the web application using one or more interfaces provided by the web application. In one example, the data import engine (100) scrapes the financial data from a profile of the tax paying entity on a website of the data provider. In another example, the data import engine (100) uses a predefined template to navigate the web application or a server application of the data provider. Based on the template, the data import engine (100) may send one or more requests for data or may scrape the data according to one or more locations, application programming interfaces (APIs), storage locations, and/or credentials identified by the template. In one or more embodiments of the invention, the data import engine (100) includes functionality to update the template based on usage data. Thus, if a predefined number of tax paying entities flag a template as being inaccurate or outdated, the data import engine (100) may modify the template accordingly (e.g., to point to a new web page, storage location, etc.). The data import engine (100) may be configured to detect a broken connection and to request corrected data from the user and/or data provider accordingly.

In one or more embodiments of the invention, the data import engine (100) includes functionality to communicate with a financial management application (FMA) (not shown) used by the tax paying entity. The FMA may include functionality to detect a financial transaction corresponding to a potential deduction on the financial return of the tax paying entity. The FMA may be configured to determine that the tax paying entity may qualify for a tax deduction and to automatically assign the financial transaction to a deduction category. In one or more embodiments of the invention, the FMA is configured to identify one or more data providers based on transactions in a financial account of the tax paying entity. For example, the FMA may identify one or more payments to a charitable organization, hospital, or government agency. Thus, the FMA may send the identified data provider(s) to the data import engine (100) for subsequent downloading of financial data.

In one or more embodiments of the invention, the data import engine (100) includes functionality to identify a government agency (130) (i.e., data provider) associated with the tax deduction. The data import engine (100) may then request credentials for the government agency (130) from the tax paying entity and/or request financial data required for claiming the deduction from the government agency (130). In one or more embodiments of the invention, the FMA, the data import engine (100), and/or the tax preparation application (110) are operatively connected and are configured to provide a seamless user experience using one or more common or connected user interfaces.

In one or more embodiments of the invention, the data import engine (100) includes functionality to identify one or more previously filed financial returns of the tax paying entity. The data import engine (100) may identify one or more data providers (135) in the previously filed returns and may ask the tax paying entity if they wish to import financial data for a current financial return from the identified data providers (135). In one or more embodiments of the invention, the data import engine (100) requests credentials corresponding to the identified data providers (135) from the tax paying entity and/or sends a request for the required data to the data providers (135).

In one or more embodiments of the invention, the tax preparation application (110) is a software application or a set of software applications executing on one or more hardware processors. The tax preparation application (110) may be a web application in a server of a data center and/or a cloud computing application in a network distributed system. Alternatively, the tax preparation application (110) may be a software application residing in a personal computing device (e.g., smartphone, laptop computer, desktop computer, etc.) of a user. In one or more embodiments of the invention, the tax preparation application (110) is integrated within or operatively connected to the data import engine (100), a financial management application (FMA), or other type of application.

In one or more embodiments of the invention, the tax preparation application (110) includes functionality to import financial data received from the data import engine (100) into a financial return of the tax paying entity. The financial data may be used in a worksheet to calculate one or more values entered into the financial return or may be directly entered into one or more fields of the financial return. For example, mortgage interest information obtained from a lender may be added to one or more other deductions prior to being entered on a personal income tax return.

In one or more embodiments of the invention, the tax preparation application (110) includes functionality to generate a request to download financial data from one or more data providers (135). The tax preparation application (110) may have one or more user interfaces configured to receive input from a user (e.g., the tax paying entity). In one or more embodiments of the invention, the tax preparation application (110) includes functionality to identify financial data required for completion of the financial return. The user interface may allow users to request the required financial data from one or more data providers (135).

In one or more embodiments of the invention, the data repository (105) is a database or storage application residing on one or more servers. For example, the data repository (105) may be a distributed database management system (DBMS) (or a component thereof), a clustered database, a standalone flat file, and/or any storage software residing on one or more physical storage devices. Examples of a storage device may include, but are not limited to, a hard disk drive, a tape drive, and/or a solid state drive or memory device. Any type of database or storage application can be used, in accordance with various embodiments of the invention.

Figure 2:
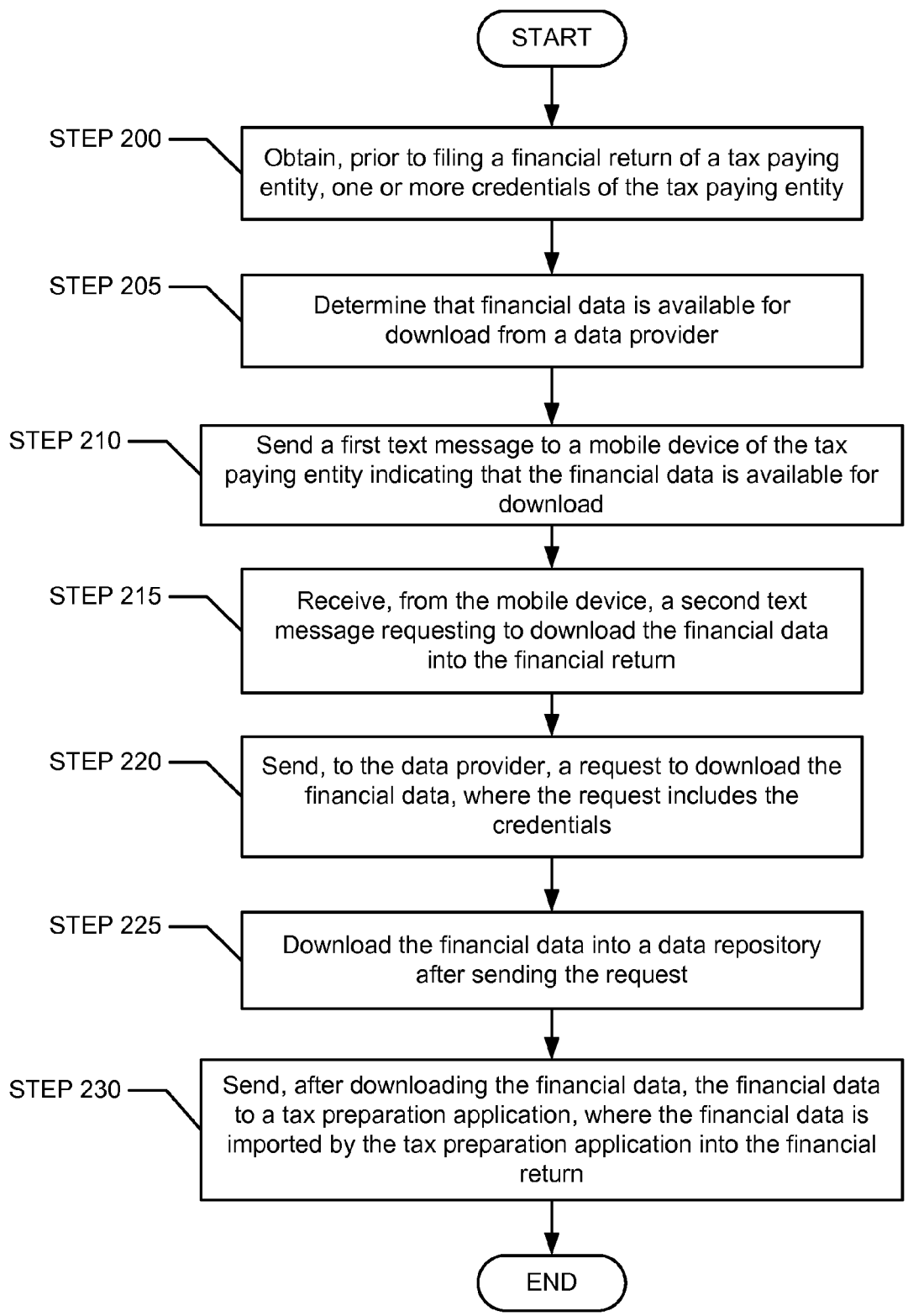
FIG. 2 shows a flowchart in accordance with one or more embodiments of the invention.

FIG. 2 shows a flowchart of a method for creating an event in a calendar based on checkins to a social networking website. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 2 should not be construed as limiting the scope of the invention.

In STEP 200, in one or more embodiments of the invention, one or more credentials of the tax paying entity are obtained prior to filing a financial return of the tax paying entity. The credentials may be obtained at any time prior to filing or initiating a new financial return of the tax paying entity. For example, a tax paying entity may register a new account with a data import engine (e.g., data import engine (100) of FIG. 1A, discussed above) and may enter identifying information, one or more data providers, and/or the aforementioned credentials into a user interface of the data import engine prior to the beginning of a tax filing period.

In STEP 205, in one or more embodiments of the invention, it is determined that financial data is available for download from a data provider. The data provider may provide data periodically (e.g., upon availability) or only once for a given tax filing period. Any method of determining the availability of the financial data may be used, in accordance with various embodiments of the invention. For example, the data provider may be polled periodically or the data provider may push the data to a data import engine (e.g., data import engine (100) of FIG. 1A, discussed above) upon availability.

In STEP 210, in one or more embodiments of the invention, a first text message is sent to a mobile device of the tax paying entity. The first text message indicates that the financial data is available for download. The text message may be sent immediately upon determining that the financial data is available for download or may be sent periodically. In one or more embodiments of the invention, the text message may include an indication of any number of data providers from which financial data is available. The text message may be sent at any time before, during, or after filing of the financial return, in accordance with various embodiments of the invention. In one or more embodiments of the invention, if the financial data is required after the filing of the financial return, the tax paying entity may elect to file an amendment to the financial return.

In STEP 215, in one or more embodiments of the invention, a second text message requesting to download the financial data into the financial return is received from the mobile device. The user of the mobile device (i.e., the tax paying entity or a representative of the tax paying entity) may read the first text message and elect to either download the financial data, reject the proposal to download the financial data, or do nothing. If the user elects to download the financial data, the user may initiate the second text message using a user interface of the mobile device. The second text message may include a selection of one or more options presented to the user in the first text message (e.g., selection of a data provider or specific data).

In STEP 220, in one or more embodiments of the invention, a request to download the financial data is sent to the data provider. The request may include the credentials, identifying information of the tax paying entity, a tax filing period, and/or any other relevant information required by the data provider. STEP 220 may not be performed if the data is made available automatically (e.g., in an FTP repository).

In STEP 225, in one or more embodiments of the invention, the financial data is downloaded into a data repository after sending the request. Any method of notification may be used to indicate that the data is available for download. For example, either a push or pull notification may be used to initiate the download of data into the tax preparation application (110).

In STEP 230, in one or more embodiments of the invention, the financial data is sent to a tax preparation application after being downloaded. The financial data is then imported by the tax preparation application into the financial return.

The following section describes various examples of the invention. The examples are included to aid in the understanding of the invention but are not intended to limit the scope of the invention.

Figure 3A:
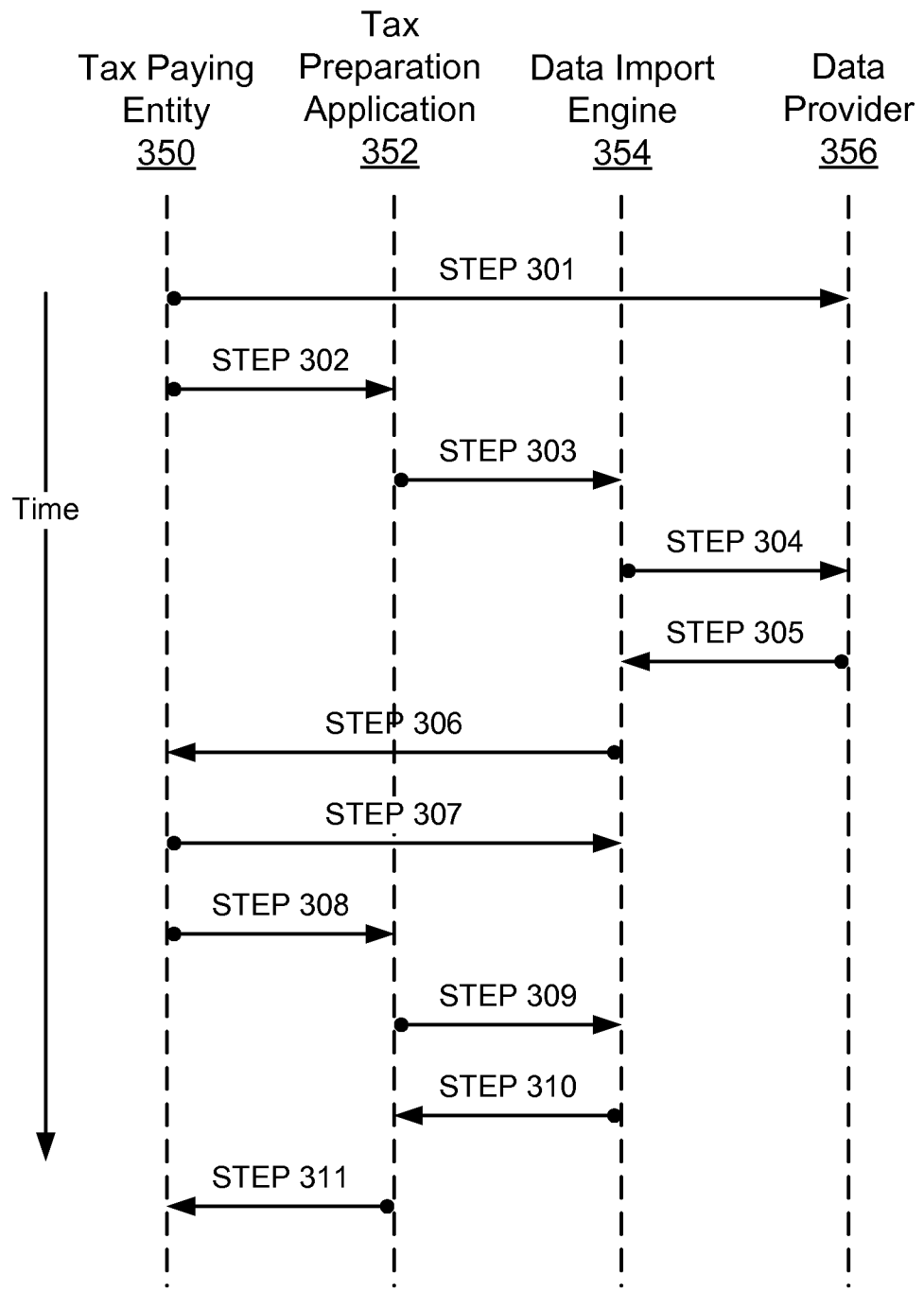
FIG. 3A shows an example sequence diagram in accordance with one or more embodiments of the invention.

FIG. 3A depicts an example sequence diagram of communication between a tax paying entity (350), a tax preparation application (352), a data import engine (354), and a data provider (356), in accordance with one or more embodiments of the invention.

In this example, an individual taxpayer ("Paul Schmidt") is employed by XYZ Computer Repair, Inc. (hereinafter "XYZ") during the 2008 tax year. Paul provides his personal information and selects an income tax withholding amount upon beginning employment with XYZ sometime before 2008 (STEP 301).

Continuing the example, during 2008 Paul accesses the tax preparation application (352) and creates an account by providing his personal information (STEP 302). The tax preparation application (352) provides Paul's personal information to a data import engine (354) immediately thereafter (STEP 303). Upon determining that Paul is employed by XYZ, the data import engine (354) identifies a payroll provider of XYZ in a data repository containing hundreds of employer payroll records. Furthermore, the data import engine (354) obtains a previously filed tax return of Paul from a tax preparation repository. In the previously filed return, the data import engine (354) identifies two financial institutions holding investment and interest bearing accounts and a home mortgage interest deduction for a home owned by Paul. Thus, a total of four data providers (356) are identified (i.e., a payroll provider, two financial institutions, and a lender).

Figure 3B:
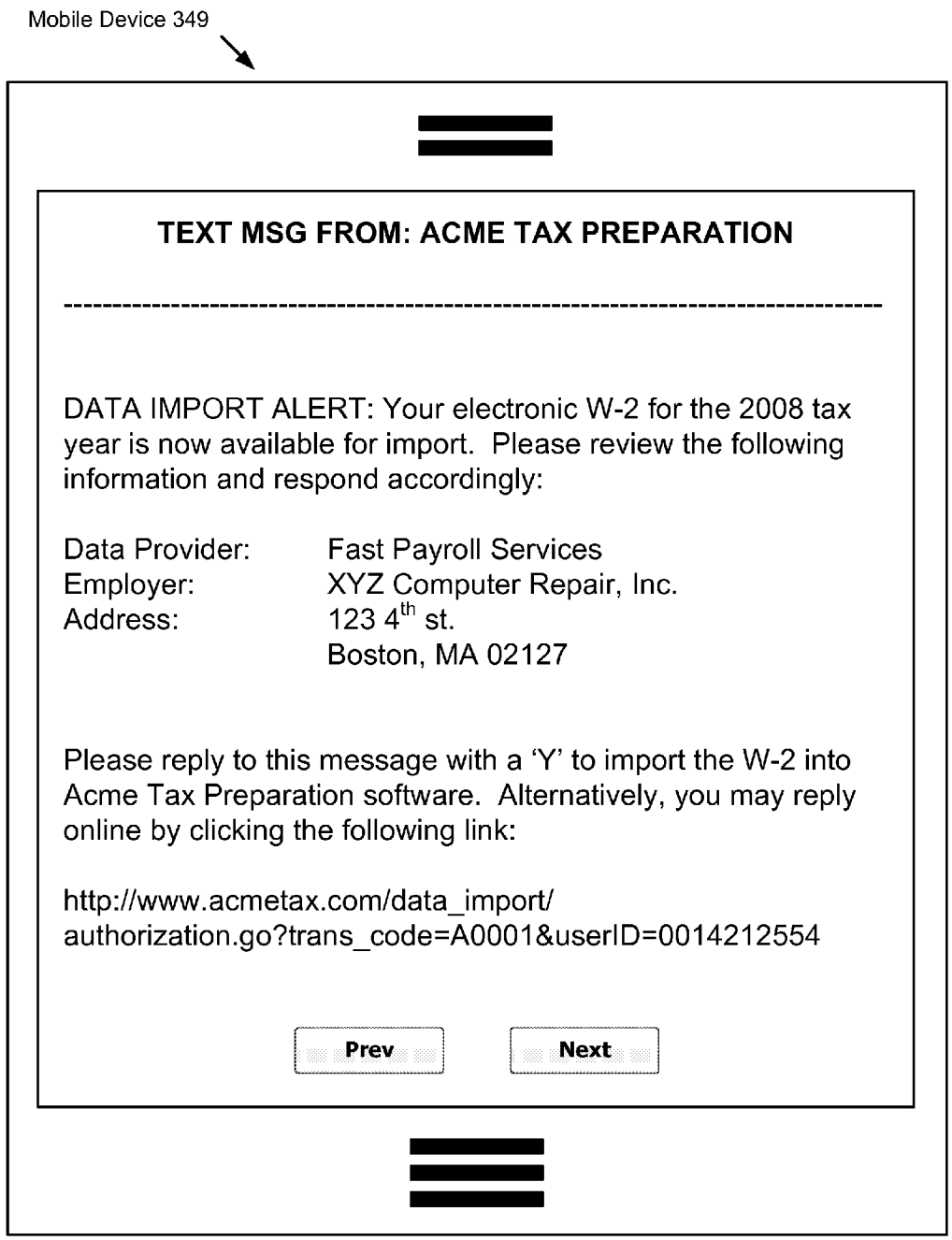
FIG. 3B shows an example screenshot of a mobile device in accordance with one or more embodiments of the invention.

Continuing the example, the data import engine (354) sends a request to each data provider (356) requesting financial data relevant to Paul Schmidt (STEP 304). The request includes identifying personal information as well as parameters identifying the 2008 tax year. In the coming months (throughout 2008 and the early part of 2009), the data providers (356) provide the requested financial data as it becomes available (STEP 305). Some data providers (356) provide the data at one time, while others provide it in smaller segments over time. Each time data is made available by a data provider (356), the data import engine (354) sends a short message service (SMS) text message to Paul's mobile device indicating that the data is available for download (STEP 306). FIG. 3B depicts an example screenshot of Paul's mobile device (349) showing an SMS message. The SMS message depicted by this screenshot indicates that financial data is available for download from Fast Payroll Services (i.e., the payroll provider of XYZ).

Continuing the example, Paul responds to each SMS message by sending a reply SMS message to the data import engine (354) (STEP 307). In the reply SMS message, Paul includes a 'Y' character indicating that he wishes to download the available financial data.

Figure 3C:
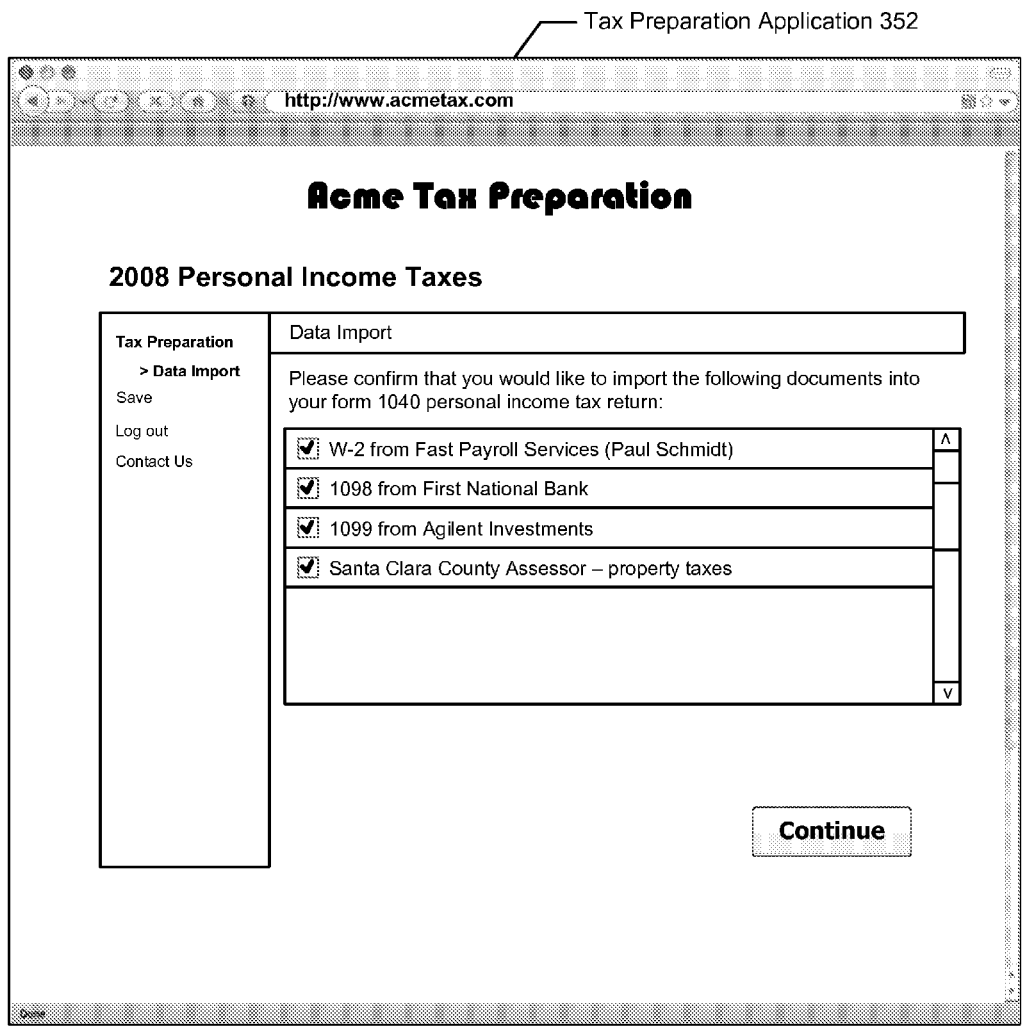
FIG. 3C shows an example screenshot of a tax preparation application in accordance with one or more embodiments of the invention.

Continuing the example, after downloading all available data from the data providers (356), Paul initiates another session with the tax preparation application (352) in order to initiate creation of a personal income tax return for the 2008 tax year (STEP 308). Upon launching, the tax preparation application (352) accesses the data import engine (354) and determines that data is available from four data providers (356) (STEP 309). The tax preparation application (352) then displays an interface showing each data provider (356) from which data was downloaded for Paul. FIG. 3C depicts an example screenshot of the tax preparation application (352) displaying the data providers. The interface prompts Paul to import the financial data from the various data providers (356) into his 2008 personal income tax return.

Continuing the example, Paul selects the option to import all available data for each of the four data providers (356). The tax preparation application (352) then imports (STEP 310) the available data into Paul's personal income tax return and proceeds to ready the tax return for filing. Upon completing the import, the tax preparation application (352) notifies Paul that the data was imported successfully (STEP 311) and proceeds to file his tax return with the internal revenue service (IRS).

Figure 4:
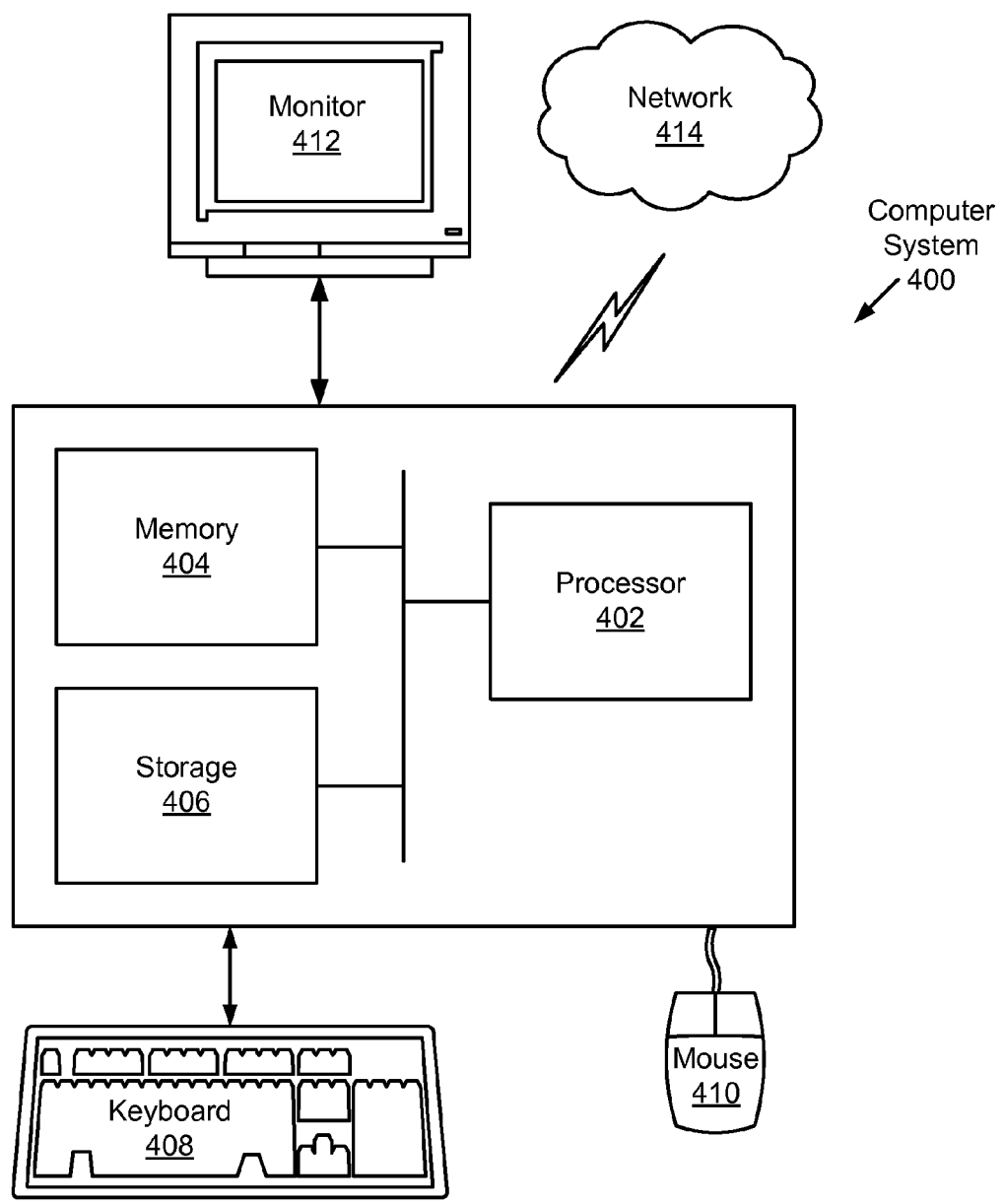
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402) (such as a central processing unit (CPU), integrated circuit, hardware processor, etc.), associated memory (404) (e.g., RAM, cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, in one or more embodiments of the invention, one or more elements of the aforementioned computer system (400) may be located at a remote location and connected to the other elements over a network. Further, embodiments of the invention may be implemented on a distributed system having a plurality of nodes, where each portion of the invention (e.g., data import engine (100), data repository (105), tax preparation application (110), etc. of FIG. 1A, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By notifying a tax entity that financial data is available for download from one or more data providers prior to preparation and/or filing of a financial return, it may be possible to reduce the preparation time of the financial return.

By sending a text message notifying a tax paying entity that financial data required in the filing of a financial return is available for download, it may be possible to aggregate required financial data with reduced effort on the part of the tax paying entity. Furthermore, the amount of time spent by the tax paying entity per session with a tax preparation application may be reduced.

By receiving a text message from a tax paying entity indicating that financial data should be downloaded from a data provider, it may be possible to aggregate required financial data with reduced effort on the part of the tax paying entity.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for importing financial data, comprising:
identifying, by a computer processor, one or more data providers, wherein identifying the one or more data providers comprises:
receiving, over a predefined time period, a plurality of location coordinates from a mobile device of a tax paying entity, wherein the plurality of location coordinates correspond to a periodic action of the tax paying entity,
determining whether an address of a first data provider is within a predefined distance of a location depicted by the plurality of location coordinates,
after determining that the address of the first data provider is within the predefined distance, requesting one or more first credentials corresponding to the first data provider from the tax paying entity, and
receiving the one or more first credentials of the tax paying entity;
after identifying the first data provider, determining, by the computer processor, that a first plurality of financial data is available for download from the first data provider;
sending, by the computer processor, a first notice text message to the mobile device, wherein the first notice text message indicates that the first plurality of financial data is available for download;
receiving, from the mobile device, a first reply text message, wherein the first reply text message indicates approval to download the first plurality of financial data from the first data provider and to proceed importing the first plurality of financial data into a tax preparation application;
sending, by the computer processor, a first request to the first data provider to download the first plurality of financial data, wherein the first request comprises the one or more first credentials;
downloading, after the first request is authenticated via the one or more first credentials, the first plurality of financial data into a data repository; and
sending the downloaded first plurality of financial data to the tax preparation application, wherein the sending comprises importing, by the tax preparation application, the first plurality of financial data from the data repository for use in an income tax return of the tax paying entity.

2. The method of claim 1, further comprising:
accessing a website of the first data provider using the one or more first credentials, wherein downloading the first plurality of financial data comprises scraping the first plurality of financial data from the accessed website.

3. The method of claim 1, wherein identifying the one or more data providers further comprises:
detecting, by a financial management application of the taxpaying entity, a financial transaction corresponding to a tax deduction category,
determining, by the financial management application, based on the financial transaction, that the tax paying entity may qualify for a tax deduction, identifying a second data provider associated with the tax deduction, wherein the second data provider is a government agency, requesting one or more second credentials corresponding to the government agency from the tax paying entity, and receiving the one or more second credentials of the tax paying entity, and wherein the method further comprises:

after identifying the second data provider, determining, by the computer processor, that a second plurality of financial data is available for download from the government agency;

sending, by the computer processor, a second notice text message to the mobile device, wherein the second notice text message indicates that the second plurality of financial data is available for download;

receiving, from the mobile device, a second reply text message, wherein the second reply text message indicates approval to download the second plurality of financial data from the government agency and to proceed importing the second plurality of financial data into the tax preparation application;

sending, by the computer processor, a second request to the government agency to download the second plurality of financial data, wherein the second request comprises the one or more second credentials, downloading, after the second request is authenticated via the one or more second credentials, the second plurality of financial data into the data repository; and sending the downloaded second plurality of financial data to the tax preparation application, wherein the sending comprises importing, by the tax preparation application, the second plurality of financial data from the data repository for use in the income tax return of the tax paying entity.

4. The method of claim 1, wherein identifying the one or more data providers further comprises:

identifying a previously filed income tax return of the tax paying entity, identifying a second data provider in the previously filed income tax return, and in response to identifying the second data provider, requesting one or more second credentials corresponding to the second data provider from the tax paying entity, and receiving the one or more second credentials of the tax paying entity, and wherein the method further comprises:

after identifying the second data provider, determining, by the computer processor, that a second plurality of financial data is available for download from the second data provider, sending, by the computer processor, a second notice text message to the mobile device, wherein the second notice text message indicates that the second plurality of financial data is available for download, receiving, from the mobile device, a second reply text message, wherein the second reply text message indicates approval to download the second plurality of financial data from the second data provider and to proceed importing the second plurality of financial data into the tax preparation application, sending, by the computer processor, a second request to the second data provider to download the second plurality of financial data, wherein the second request comprises the one or more second credentials, downloading, after the second request is authenticated via the one or more second credentials, the second plurality of financial data into the data repository, and sending the downloaded second plurality of financial data to the tax preparation application, wherein the sending comprises importing, by the tax preparation application, the second plurality of financial data from the data repository for use in the income tax return of the tax paying entity.

5. The method of claim 1, wherein identifying the one or more data providers further comprises:

accessing a profile of the tax paying entity on a social networking website, identifying a second data provider from the profile, after identifying the second data provider, requesting one or more second credentials corresponding to the second data provider from the tax paying entity, and receiving the one or more second credentials of the tax paying entity, and wherein the method further comprises:

after identifying the second data provider, determining, by the computer processor, that a second plurality of financial data is available for download from the second data provider, sending, by the computer processor, a second notice text message to the mobile device, wherein the second notice text message indicates that the second plurality of financial data is available for download, receiving, from the mobile device, a second reply text message, wherein the second reply text message indicates approval to download the second plurality of financial data from the second data provider and to proceed importing the second plurality of financial data into the tax preparation application, sending, by the computer processor, a second request to the second data provider to download the second plurality of financial data, wherein the second request comprises the one or more second credentials, downloading, after the second request is authenticated via the one or more second credentials, the second plurality of financial data into the data repository, and sending the downloaded second plurality of financial data to the tax preparation application, wherein the sending comprises importing, by the tax preparation application, the second plurality of financial data from the data repository for use in the income tax return of the tax paying entity.

6. The method of claim 1, further comprising:

prior to downloading the first plurality of financial data, periodically downloading, from the first data provider, a plurality of tax data for a plurality of tax entities involved with the first data provider into the data repository, wherein the plurality of tax entities comprises the tax paying entity; and after downloading the first plurality of financial data, identifying the first plurality of financial data in the data repository.

7. The method of claim 1, wherein the first text message is one selected from a group consisting of a short message service (SMS) message and a mobile application notification.

8. The method of claim 1, further comprising:

calling the mobile device using an interactive voice response (IVR) system;

playing, by the IVR system, an automated recording of the first text message to the tax paying entity; and receiving, by the IVR system, a touch tone selection of an option from the tax paying entity to import the first plurality of financial data.

9. The method of claim 1, wherein sending the request to download the first plurality of financial data occurs prior to preparing the income tax return.

10. The method of claim 1, wherein receiving the one or more first credentials comprises:
   accessing a financial management application of the tax paying entity, wherein the financial management application stores the one or more first credentials for accessing a website of the first data provider, and
   obtaining the one or more first credentials from the financial management application.

11. The method of claim 1, wherein the first data provider is one selected from a group consisting of a financial institution, a payroll provider, a healthcare provider, and a government agency.

12. The method of claim 1, wherein the first plurality of financial data comprises one selected from a group consisting of investment income data, wage income data, and interest income data.

13. The method of claim 1, wherein the tax paying entity is one selected from a group consisting of an individual taxpayer and a business.

14. A system for importing financial data, comprising:
   a processor;
   a data repository configured to store financial data; and
   a data import engine executing on the processor, the data import engine configured to:
      identify one or more data providers, wherein identifying the one or more data providers comprises:
         receiving, over a predefined time period, a plurality of location coordinates from a mobile device of a tax paying entity, wherein the plurality of location coordinates correspond to a periodic action of the tax paying entity,
         determining whether an address of a first data provider is within a predefined distance of a location depicted by the plurality of location coordinates,
         after determining that the address of the first data provider is within the predefined distance, requesting one or more first credentials corresponding to the first data provider from the tax paying entity, and
         receiving the one or more first credentials of the tax paying entity,
      after identifying the first data provider, determine that a first plurality of financial data is available for download from the first data provider,
      send a first notice text message to the mobile device, wherein the first notice text message indicates that the first plurality of financial data is available for download,
      receive, from the mobile device of the tax paying entity, a first reply text message, wherein the first reply text message indicates approval to download the first plurality of financial data from the first data provider and requesting to proceed importing the first plurality of financial data into a tax preparation application,
      send, to the first data provider, a first request to download the first plurality of financial data, wherein the first request comprises the one or more first credentials,
      download, after the first request is authenticated via the one or more first credentials, the first plurality of financial data into the data repository, and
      send the downloaded first plurality of financial data to the tax preparation application,
      wherein the sending comprises importing, by the tax preparation application, the first plurality of financial data from the data repository for use in an income tax return of the tax paying entity.

15. The system of claim 14, wherein the mobile device is configured to:
   display the first notice text message to the tax paying entity;
   generate the first reply text message; and
   send the first reply text message to the data import engine,
   wherein the first notice text message and the first reply text message are short message service (SMS) messages.

16. The system of claim 14, wherein the tax preparation application is configured to:
   generate the income tax return of the tax paying entity;
   import the first plurality of financial data into the income tax return; and
   file the income tax return with a government agency, wherein the government agency is the first data provider.

17. The system of claim 14, wherein the data import engine is further configured to:
   access a website of the first data provider using the one or more first credentials, wherein downloading the first plurality of financial data comprises scraping the first plurality of financial data from the accessed website.

18. The system of claim 14, further comprising:
   a financial management application configured to:
      detect a financial transaction corresponding to a tax deduction category; and
      determine, based on the financial transaction, that the tax paying entity may qualify for a tax deduction; and
   wherein the data import engine or financial management application is further configured to:
      identify a second data provider associated with the tax deduction, wherein the second data provider is a government agency, and
   wherein the data import engine is further configured to:
      request one or more second credentials corresponding to the government agency from the tax paying entity, and
      receive the one or more second credentials of the tax paying entity,
      after identifying the second data provider, determine that a second plurality of financial data is available for download from the government agency;
      send a second notice text message to the mobile device, wherein the second notice text message indicates that the second plurality of financial data is available for download;
      receive, from the mobile device, a second reply text message, wherein the second reply text message indicates approval to download the second plurality of financial data from the government agency and to proceed importing the second plurality of financial data into the tax preparation application;
      send a second request to the government agency to download the second plurality of financial data, wherein the second request comprises the one or more second credentials,
      download, after the second request is authenticated via the one or more second credentials, the second plurality of financial data into the data repository, and
      send the downloaded second plurality of financial data to the tax preparation application, wherein the sending comprises importing, by the tax preparation application, the second plurality of financial data from the data repository for use in the income tax return of the tax paying entity.

19. A non-transitory computer-readable storage medium comprising a plurality of software instructions for importing financial data, the plurality of software instructions when executed by a computer processor causes the computer processor to:
   identify one or more data providers, wherein identifying the one or more data providers comprises:
      receiving, over a predefined time period, a plurality of location coordinates from a mobile device of a tax paying entity, wherein the plurality of location coordinates correspond to a periodic action of the tax paying entity,
      determining whether an address of a first data provider is within a predefined distance of a location depicted by the plurality of location coordinates,
      after determining that the address of the first data provider is within the predefined distance, requesting one or more first credentials corresponding to the first data provider from the tax paying entity, and
      receiving the one or more first credentials of the tax paying entity;
   after identifying the first data provider, determine that a first plurality of financial data is available for download from the first data provider;
   send a first notice text message to the mobile device, wherein the first notice text message indicates that the first plurality of financial data is available for download;
   receive, from the mobile device, a first reply text message, wherein the first reply text message indicates approval to download the first plurality of financial data from the first data provider and to importing the first plurality of financial data into a tax preparation application;
   send, to the first data provider, a first request to download the first plurality of financial data, wherein the first request comprises the one or more first credentials;
   download, after the first request is authenticated via the one or more first credentials, the first plurality of financial data into a data repository; and
   send the downloaded first plurality of financial data to the tax preparation application wherein the sending comprises importing, by the tax preparation application, the first plurality of financial data from the data repository for use in an income tax return of the tax paying entity.

20. The non-transitory computer-readable storage medium of claim 19, wherein the plurality of software instructions further cause the computer processor to:
   access a website of the first data provider using the one or more first credentials, wherein downloading the first plurality of financial data comprises scraping the first plurality of financial data from the accessed website.

21. The non-transitory computer-readable storage medium of claim 19, wherein identifying the one or more data providers further comprises:
   detecting, by a financial management application of the taxpaying entity, a financial transaction corresponding to a tax deduction category,
   determining, by the financial management application, based on the financial transaction, that the tax paying entity may qualify for a tax deduction,
   identifying a second data provider associated with the tax deduction, wherein the second data provider is a government agency,
   requesting one or more second credentials corresponding to the government agency from the tax paying entity, and
   receiving the one or more second credentials of the tax paying entity, and
   wherein the plurality of software instructions further cause the computer processor to:
   after identifying the second data provider, determine that a second plurality of financial data is available for download from the government agency;
   send a second notice text message to the mobile device, wherein the second notice text message indicates that the second plurality of financial data is available for download;
   receive, from the mobile device, a second reply text message, wherein the second reply text message indicates approval to download the second plurality of financial data from the government agency and to proceed importing the second plurality of financial data into the tax preparation application;
   send a second request to the government agency to download the second plurality of financial data, wherein the second request comprises the one or more second credentials,
   download, after the second request is authenticated via the one or more second credentials, the second plurality of financial data into the data repository; and
   send the downloaded second plurality of financial data to the tax preparation application, wherein the sending comprises importing, by the tax preparation application, the second plurality of financial data from the data repository for use in the income tax return of the tax paying entity.

22. The non-transitory computer-readable storage medium of claim 19, wherein identifying the one or more data providers further comprises:
   identifying, a previously filed income tax return of the tax paying entity,
   identifying, a second data provider in the previously filed income tax return, and
   in response to identifying the second data provider, requesting one or more second credentials corresponding to the second data provider from the tax paying entity
   receiving the one or more second credentials of the tax paying entity, and wherein the plurality of software instructions further cause the computer processor to:
   after identifying the second data provider, determine that a second plurality of financial data is available for download from the second data provider,
   send a second notice text message to the mobile device, wherein the second notice text message indicates that the second plurality of financial data is available for download,
   receive, from the mobile device, a second reply text message, wherein the second reply text message indicates approval to download the second plurality of financial data from the second data provider and to proceed importing the second plurality of financial data into the tax preparation application,
   send a second request to the second data provider to download the second plurality of financial data, wherein the second request comprises the one or more second credentials,
   download, after the second request is authenticated via the one or more second credentials, the second plurality of financial data into the data repository, and
   send the downloaded second plurality of financial data to the tax preparation application, wherein the sending comprises importing, by the tax preparation application, the second plurality of financial data from the data repository for use in the income tax return of the tax paying entity.

23. The non-transitory computer-readable storage medium of claim 19, wherein identifying one or more data providers further comprises:

accessing a profile of the tax paying entity on a social networking website, identifying a second data provider from the profile, after identifying the second data provider, requesting one or more second credentials corresponding to the second data provider from the tax paying entity, and receiving, the one or more second credentials of the tax paying entity, and wherein the plurality of software instructions further cause the computer processor to:

after identifying the second data provider, determine that a second plurality of financial data is available for download from the second data provider, send a second notice text message to the mobile device, wherein the second notice text message indicates that the second plurality of financial data is available for download, receive, from the mobile device, a second reply text message, wherein the second reply text message indicates approval to download the second plurality of financial data from the second data provider and to proceed importing the second plurality of financial data into the tax preparation application, send a second request to the second data provider to download the second plurality of financial data, wherein the second request comprises the one or more second credentials, download, after the second request is authenticated via the one or more second credentials, the second plurality of financial data into the data repository, and send the downloaded second plurality of financial data to the tax preparation application, wherein the sending comprises importing, by the tax preparation application, the second plurality of financial data from the data repository for use in the income tax return of the tax paying entity.

24. The non-transitory computer-readable storage medium of claim 19, wherein the plurality of software instructions further cause the computer processor to:

prior to downloading the first plurality of financial data, periodically download, from the first data provider, a plurality of tax data for a plurality of tax entities involved with the first data provider into the data repository, wherein the plurality of tax entities comprises the tax paying entity; and after downloading the first plurality of financial data, identify the first plurality of financial data in the data repository.

25. The non-transitory computer-readable storage medium of claim 19, wherein the first text message is one selected from a group consisting of a short message service (SMS) message and a mobile application notification.

26. The non-transitory computer-readable storage medium of claim 19, wherein the plurality of software instructions further cause the computer processor to:

call the mobile device using an interactive voice response (IVR) system; and play, by the IVR system, an automated recording of the first text message to the tax paying entity.

* * * * *